Nov. 24, 1942.  R. M. BRASINGTON  2,302,835
CONTAINER SEAL
Filed Oct. 6, 1941
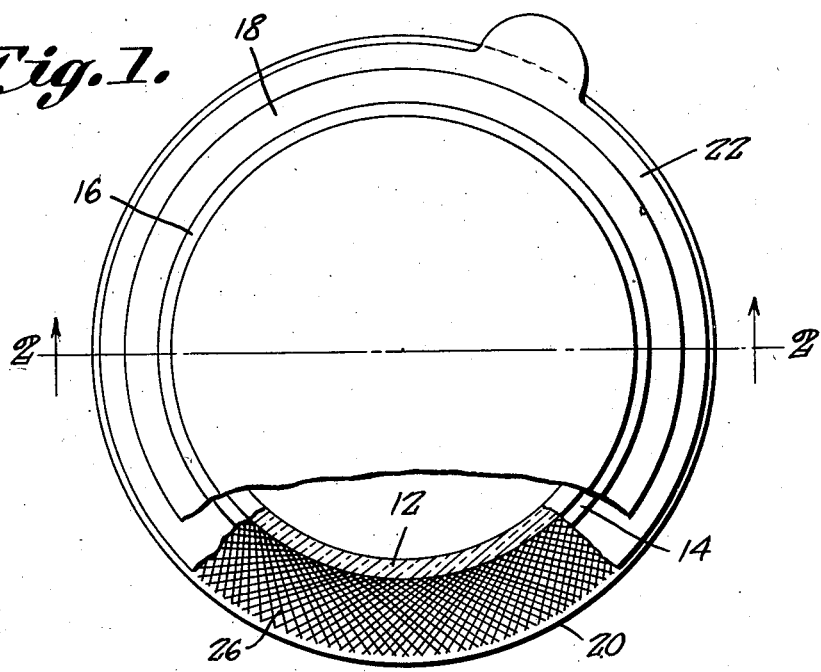
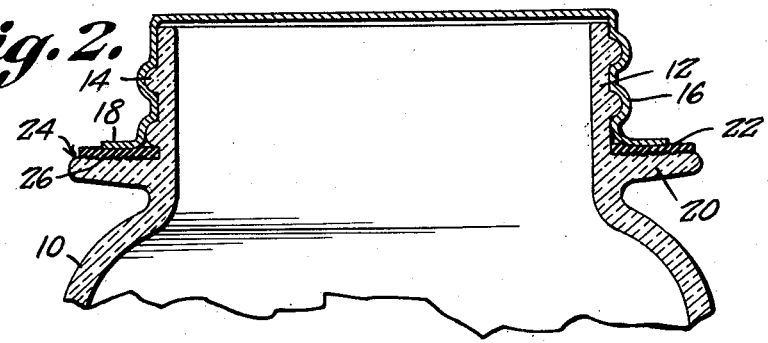
Ross M. Brasington,
INVENTOR.
BY Victor J. Evans & Co.
ATTORNEYS Patented Nov. 24, 1942

2,302,835

UNITED STATES PATENT OFFICE 2,302,835

CONTAINER SEAL

Ross M. Brasington, Akron, Ohio

Application October 6, 1941, Serial No. 413,841

1 Claim. (Cl. 215—40)

My invention relates to containers such as Mason jars and the like, wherein a sealing ring or gasket of rubber or equivalent material is pressed between the cap and a shoulder on the container, and has among its objects and advantages the provision of an improved shoulder structure designed to provide an effective sealed condition between the cap and the cover when the ring or gasket is pressed therebetween.

In the accompanying drawing:

Figure 1 is a top plan view of a container in accordance with my invention with a portion broken away for the purpose of illustration; and Figure 2 is a sectional view along the line 2—2 of Figure 1.

In the embodiment selected for illustration, the container 10 includes the usual neck 12 having screw threads 14 for threaded connection with a closure cap 16. This cap is provided with a flange 18 between which and a shoulder 20 of the container is pressed a rubber ring or gasket 22. In conventional containers along the lines of Mason jars, the cap flanges and shoulders do not always engage the sealing ring in perfect parallelism. The caps are designed for re-use and over a period of time many of the flanges become bent so as not to engage the sealing ring in a uniform manner about its circumference. Unless the flange and the shoulder engage the sealing ring in perfect parallelism, the points of greatest pressure effected on the sealing ring cause excessive stretch in certain portions of the sealing ring. Such conditions cause the sealing ring to become excessively thin in certain regions with the result that a perfect seal cannot be attained. In addition, the sealing ring is subjected to lateral shifting. Frequently the uneven pressure effective on the sealing ring is such as to cause buckling thereof in such degree as to completely destroy the sealing function of the ring.

In the present case, the face 24 of the shoulder 20 engaging the sealing ring 22 is knurled, as at 26. The knurled surface eliminates creeping of the rubber ring as well as lateral shifting thereof. Thus the ring 22 retains its uniform thickness throughout its entire circumference so as to provide the necessary thickness or mass essential to proper sealing through tightening of the cap 16. I have found that such a construction eliminates all creeping and provides an effective seal, in addition to providing a construction wherein the cap may be easily unscrewed without necessitating destruction of the sealing ring, as by pulling or tearing the ring laterally from the shoulder. Thus the ring 22 may be reused, since no damage is caused to the ring by the knurled surface 26.

Without further elaboration, the foregoing will so fully illustrate my invention, that others may, by applying current knowledge, readily adapt the same for use under various conditions of service.

I claim:

The combination of a container having a shoulder constituting a rest for a sealing ring, a screw cap having threaded connection with said container and a flange for pressing the sealing ring between the flange and said shoulder, and a knurled ring engaging surface on said shoulder.

ROSS M. BRASINGTON.